United States Patent
Oberheide et al.

(10) Patent No.: US 9,930,025 B2
(45) Date of Patent: Mar. 27, 2018

(54) SYSTEM AND METHOD FOR AUTOMATIC SERVICE DISCOVERY AND PROTECTION

(71) Applicant: Duo Security, Inc., Ann Arbor, MA (US)

(72) Inventors: Jon Oberheide, Ann Arbor, MI (US); Dug Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/075,687

(22) Filed: Mar. 21, 2016

(65) Prior Publication Data

US 2016/0285847 A1 Sep. 29, 2016

Related U.S. Application Data

(60) Provisional application No. 62/138,197, filed on Mar. 25, 2015, provisional application No. 62/137,076, filed on Mar. 23, 2015.

(51) Int. Cl.
*H04L 29/06* (2006.01)
*H04L 29/08* (2006.01)
(Continued)

(52) U.S. Cl.
CPC .............. *H04L 63/08* (2013.01); *G06F 9/00* (2013.01); *G06F 21/6281* (2013.01);
(Continued)

(58) Field of Classification Search
CPC ..... H04L 63/00; H04L 63/02; H04L 63/0227; H04L 63/0263; H04L 63/08;
(Continued)

(56) References Cited

U.S. PATENT DOCUMENTS

| 6,728,767 B1 | 4/2004 | Day et al. |
| 6,993,588 B2 | 1/2006 | Davis et al. |

(Continued)

FOREIGN PATENT DOCUMENTS

| CN | 101453320 B | 6/2011 |
| CN | 201919010 U | 8/2011 |
| JP | 2011243192 A | 12/2011 |

*Primary Examiner* — Jung Kim
*Assistant Examiner* — Adrian Stoica
(74) *Attorney, Agent, or Firm* — Jeffrey Schox; Padowithz Alce

(57) ABSTRACT

A system for automatically discovering services operating on a network including a service discovery database configured to store expected service behavioral characteristics and service identities of the services operating on the network, a set of service discovery modules configured to collect service behavioral data of the services operating on the network, and a service discovery module controller communicatively coupled to the service discovery module database and the set of service discovery modules, the service discovery module controller configured to generate service behavioral characteristics from the service behavioral data, analyze the service behavioral characteristics using the expected service behavioral characteristics, resulting in a first behavioral analysis, identify a first service identity of at least one service operating on the network from the first behavioral analysis and an association of the first service identity and the expected service behavioral characteristics.

24 Claims, 12 Drawing Sheets

(51) Int. Cl.
*H04L 29/12* (2006.01)
*G06F 9/00* (2006.01)
*G06F 21/62* (2013.01)

(52) U.S. Cl.
CPC ...... *H04L 61/1511* (2013.01); *H04L 61/1541* (2013.01); *H04L 63/029* (2013.01); *H04L 63/0272* (2013.01); *H04L 67/16* (2013.01); *G06F 2221/2101* (2013.01); *H04L 67/02* (2013.01)

(58) Field of Classification Search
CPC . H04L 63/0853; H04L 63/14; H04L 63/1408; H04L 63/1416; H04L 63/1425; H04L 63/1433; H04L 63/1441; H04L 63/1483; H04L 63/16; H04L 63/0272; H04L 63/029; H04L 63/0815; H04L 61/15; H04L 61/1505; H04L 61/1511; H04L 63/20; H04L 61/1541; H04L 67/00; H04L 67/02; H04L 67/16; G06F 21/00; G06F 21/50; G06F 21/55; G06F 21/552; G06F 21/554; G06F 21/56; G06F 21/566; G06F 21/57; G06F 21/577; G06F 21/62; G06F 21/6218; G06F 21/628; G06F 2221/00; G06F 2221/21; G06F 2221/2101; G06F 2221/2119
See application file for complete search history.

(56) References Cited

U.S. PATENT DOCUMENTS

| | | | |
|---|---|---|---|
| 7,716,742 B1* | 5/2010 | Roesch | H04L 67/125 726/25 |
| 8,413,111 B2 | 4/2013 | Paster | |
| 8,484,338 B2 | 7/2013 | Paster | |
| 9,088,627 B2 | 7/2015 | Nelson et al. | |
| 2005/0071643 A1* | 3/2005 | Moghe | G06F 21/316 713/182 |
| 2008/0289047 A1 | 11/2008 | Benea et al. | |
| 2010/0085883 A1 | 4/2010 | Paster | |
| 2010/0095375 A1* | 4/2010 | Krishnamurthy | G06F 17/30864 726/22 |
| 2011/0258209 A1* | 10/2011 | Gagliardi | G06F 11/3006 707/758 |
| 2013/0086677 A1* | 4/2013 | Ma | G06F 17/3089 726/22 |
| 2013/0347116 A1* | 12/2013 | Flores | H04L 63/1433 726/25 |
| 2014/0208406 A1* | 7/2014 | Austin | H04L 63/02 726/7 |
| 2015/0188932 A1* | 7/2015 | King | H04L 63/1408 726/22 |
| 2015/0213358 A1* | 7/2015 | Shelton | H04L 41/0604 706/47 |

* cited by examiner

FIGURE 3A          FIGURE 3D

SYSTEM AND METHOD FOR AUTOMATIC SERVICE DISCOVERY AND PROTECTION

CROSS-REFERENCE TO RELATED APPLICATIONS

This application claims the benefit of U.S. Provisional Application No. 62/138,197 filed 25 Mar. 2015 and U.S. Provisional Application No. 62/137,076 filed 23 Mar. 2015, which are incorporated in their entirety by this reference.

TECHNICAL FIELD

This invention relates generally to the authentication field, and more specifically to a new and useful system and method for automatic service discovery and protection.

BACKGROUND

Passwords are easily phished, captured, replayed, or otherwise compromised. To address weaknesses in passwords, two-factor authentication was developed. Two-factor authentication (2FA) is commonly deployed for sensitive applications (e.g., email, web apps, VPN) by system administrators in order to better safeguard corporate data. Unfortunately, system administrators may not be fully aware of all applications able to access sensitive data. This lack of knowledge can lead to disastrous consequences, as exemplified by a December 2014 breach of JP Morgan; in this case, a subset of JP Morgan servers were overlooked during two-factor authentication upgrades, leaving them vulnerable. Thus, there is a need in the authentication field to create a new and useful system and method for automatic service discovery and protection. This invention provides such a new and useful system and method.

BRIEF DESCRIPTION OF THE FIGURES

FIGS. 3A, 3B, 3C, and 3D are schematic representations of service discovery modules of a system of a preferred embodiment;

DESCRIPTION OF THE PREFERRED EMBODIMENTS

The following description of preferred embodiments of the invention is not intended to limit the invention to these preferred embodiments, but rather to enable any person skilled in the art to make and use this invention.

The system and method for automatic service discovery and protection function to detect services used by companies or other organizations that may benefit from the use of two-factor authentication. After detection, the system and method may additionally function to enable protection of detected services; e.g., by notifying a network administrator of detected services or, in some cases, by automatically configuring two-factor authentication.

As companies have become more technologically savvy, corporate IT departments no longer necessarily play a role in approving or monitoring every service operating on corporate networks. Individual departments or even employees may be capable of launching or operating a variety of services on corporate networks without direct involvement of centralized system administration. This de-centralization may result in services operating without the knowledge or intervention of system administrators. These unknown services may in turn not be monitored for security issues (e.g., lack of two-factor authentication), leading to potential vulnerability.

Automatic service detection enables companies or other organizations to be proactive about increasing security; through the system and method for automatic service detection, administrators are armed with the knowledge they need to protect vital network resources.

1. System for Automatic Service Discovery and Protection

Figure 1:
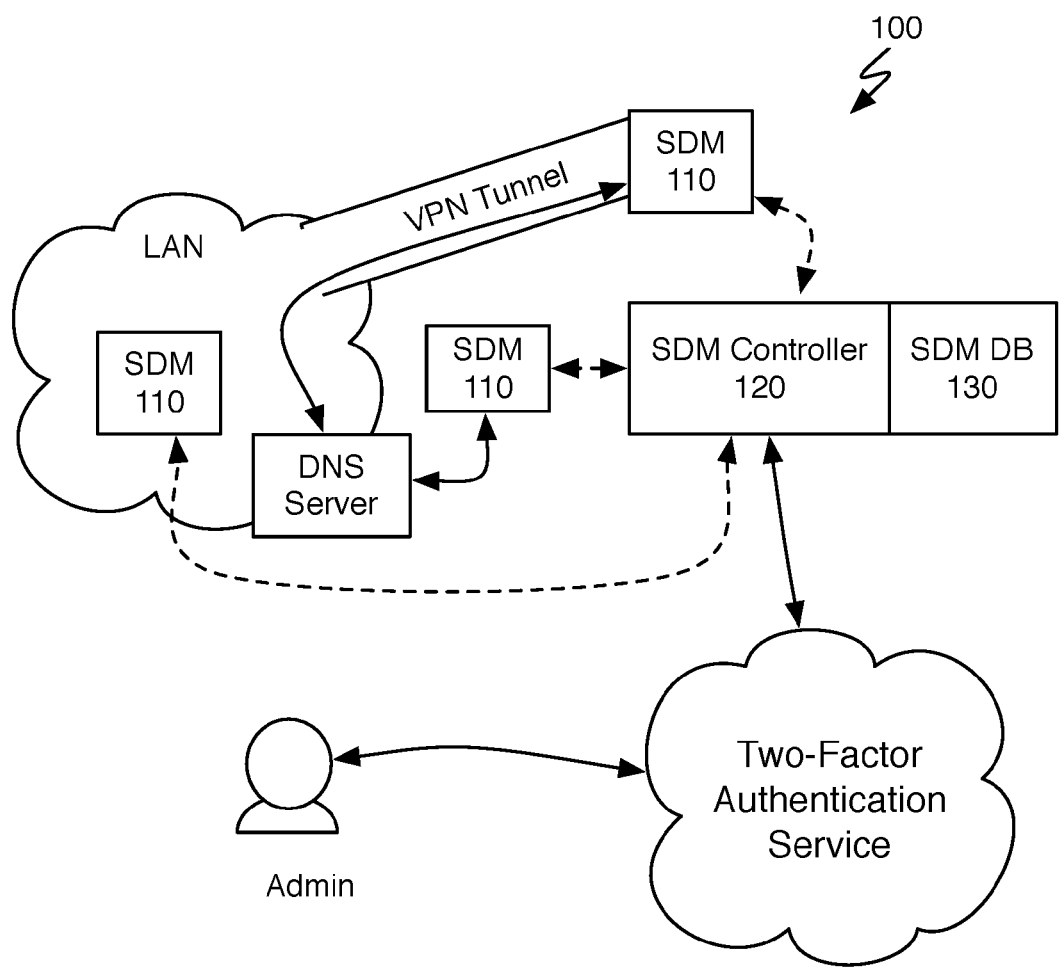
FIG. 1 is a schematic representation of a system of a preferred embodiment.

As shown in FIG. 1, a system 100 for automatic service discovery and protection includes one or more service discovery modules (SDMs) 110, a service discovery module controller (SDM Controller) 120, and a service discovery module database (SDM Database) 130.

The system 100 functions to detect services used in a network (or multiple networks) that may benefit from increased security (e.g., by implementation of two-factor authentication). The system 100 detects services using one or more service detection modules (SDMs) 110. The system 100 may include a variety of SDMs 110, each configured for a particular method of service detection or service detection environment. The SDMs 110 can be controlled and/or configured by an SDM controller 120; the SDM controller 120 may additionally or alternatively act as a processor for data transmitted by the SDMs 110. The SDM 110 can otherwise be omitted, and the SDM controller 120 can perform any of the processes associated with the SDM 110. The SDM controller 120 may integrate with the SDM database 130 to identify services based on data transmitted by the SDMs 110. Based on the identification data, the SDM controller 120 preferably communicates with a two-factor authentication service (e.g., Duo Security) to enable two-factor authentication protection of identified services. Additionally or alternatively, the SDM controller 120 can communicate with other services present on the network and/or services outside the network. Services can include: applications (e.g., web applications, native applications, applications operating on a device, applications operating at a remote server, etc.), malware protection services (e.g., virus scanners, malware removers, etc.), monitoring services (e.g., network traffic monitoring services, network performance monitoring services, etc.), network protection services (e.g., firewalls, network security policies, authorization levels), and/or any other suitable service. Devices can include a smartwatch, smartphone, tablet, desktop, and/or any other suitable device. Devices can be associated with administrators (e.g., managers of a network), users (e.g., individuals attempting to access resources on the network), and/or any other suitable entity.

1.1 Service Discovery Module Database

The SDM database 130 functions to store data relevant to service discovery and/or protection. The SDM database 130 is preferably configured to store expected service behavioral characteristics and service identities of the services operating on the network, where each service identity can be associated with the expected service behavioral characteristics in the service discovery database. The SDM database 130 may additionally or alternatively include other configuration data for SDMs 110 and/or for the SDM controller 120. The SDM database 130 is preferably implemented on a distributed computing system in the cloud, but may additionally or alternatively be located in any suitable location (e.g., an internal server of a company network). The SDM database 130 may be used, for example, to store fingerprint data (e.g., fingerprints and services linked to said fingerprints).

The SDM database 130 can store types of data including: service behavioral data (e.g., expected service behavioral data, collected service behavioral data, etc.), service behavioral characteristics (e.g., expected service behavioral characteristics, service behavioral characteristics generated from collected service behavioral data, etc.), digital fingerprints, service identities, models, 2FA preferences, administrator preferences, user preferences, administrator data, user data, device data, and/or any suitable type of data.

Service behavioral data can include: HTTP response data (e.g., headers, temporal characteristics, message content, non-header information, HTTP status code, associated HTTP request, etc.), IP addresses, hostnames, DNS query response data (e.g., sender policy framework data, source addresses, destination addresses, temporal characteristics, ports, etc.), service data associated with users of the service (e.g., characteristics of users using the service, characteristics of users authorized to access the service, usage characteristics of the service, etc.), Active Directory service data (e.g., authentication attempts, associated devices, associated users, information contained, permission levels of associated devices and users, associated services, etc.), network traffic data (e.g., relative amount of network traffic to different services, bandwidth usage, network traffic within specified time frames, network traffic from defined groups of users, types of devices generating the network traffic, types of users generating the network traffic, source, destination, temporal characteristics, content, etc.), service behavioral data received from external services (e.g., service providers providing identifying information concerning the service, etc.) and/or any other suitable type of service behavioral data.

Service behavioral characteristics can include: raw service behavioral data, processed service behavioral data, analysis of service behavioral data, and/or any other suitable type of data. A given service behavioral characteristic can be associated with one or more service identities. For example, a service behavioral characteristic regarding a specific HTTP response to a specific HTTP request can be shared amongst multiple services and/or service identities. Additionally or alternatively, multiple service behavioral characteristics can be associated with only a single service identities. For example, multiple service behavioral characteristics can be stored at the SDM database 130 and be uniquely associated with a single service and/or service identity. However, the relationship between service behavioral characteristics and service identities can be otherwise established. Expected service behavioral characteristics include service behavioral characteristics that are expected to be associated with a service. Associations between expected service behavioral characteristics and services may arise through known associations for services (e.g., service provider provides specific characteristics about services), network traffic analysis, authentication characteristics, and/or through any other suitable information.

Digital fingerprints can be generated from service behavioral characteristics and/or any suitable type of data. Digital fingerprints are preferably associated with one or more service identities. However, digital fingerprints and service identities can have any suitable relationship.

A service identity can include: a service ID (e.g., a service name, a unique code representing the service, etc.), a type of a service (e.g., security service, payroll service, customer service, communication service, etc.), a service feature (e.g., publicly accessible, internal-facing, providing a particular feature, associated permission levels, associated users, traffic, etc.), and/or any other suitable identifier.

Administrator preferences and/or user preferences can include: communication preferences (e.g., connection type for communication with administrator, for communication between SDMs and services, for communication between SDM controller 120 and other service discovery components, temporal preferences, etc.), notification preferences (e.g., temporal characteristics for frequency and timing of notifications to be communicated to administrators, form, content, options, etc.), administrator 2FA preferences (e.g., types of 2FA to implement, which services to apply 2FA, etc.), and/or any other suitable type of administrator preference.

2FA preferences can include: temporal characteristics (e.g., how long after identification of services to automatically implement 2FA, etc.), type of 2FA (e.g., 2FA based on location, device data, user response, etc.), selection of 2FA type (e.g., which type of 2FA to implement with which identified service, based on security level of identified service, based on sensitive information level of identified service, etc.), implementation of 2FA (e.g., automatic full implementation of 2FA with identified services, partial implementation of 2FA, which services receive full or partial implementation, based on what criteria, which users to implement 2FA for, etc.), and/or any other type of 2FA characteristics.

Administrator data and/or user data can include: account data, permission levels, services associated with a user, service usage characteristics, behavior on the network, and/or any other suitable type of data associated with an administrator and/or user.

Device data and/or associated user behavior can include: state of charge, memory usage, processor usage, incoming/outgoing traffic data, service usage on the device (e.g., level of user interactivity with an application, amount of time with application operating on the device, types of services accessed by the user from the device, etc.), version (e.g., device version, service version), and/or any other suitable device data.

However, the SDM database 130 can store and/or other service discovery components can leverage any of the discussed types of data, combinations of the types of data, and/or other suitable types of data.

1.2 Service Discovery Module

SDMs 110 function to collect data (e.g., service behavioral data) relevant to service discovery and/or protection. SDMs 110 can additionally or alternatively function to detect services operating on a corporate local area network (or any other network or set of networks) that may benefit from particular security measures. These particular security measures preferably consist of two factor authentication implementations, but may additionally or alternatively comprise any suitable security measures. For example, SDMs 110 may be used to detect not only that a service is being used by a network, but also that the version of that service is outdated (leading to potential vulnerability). Additional or alternatively, security measures can include installing, operating, modifying, removing, and/or ceasing: malware protection services, network protection services, communication services (e.g., means for notifying administrators, communications to other services on the network or other networks, etc.), and/or any other suitable security measure.

Figure 2:
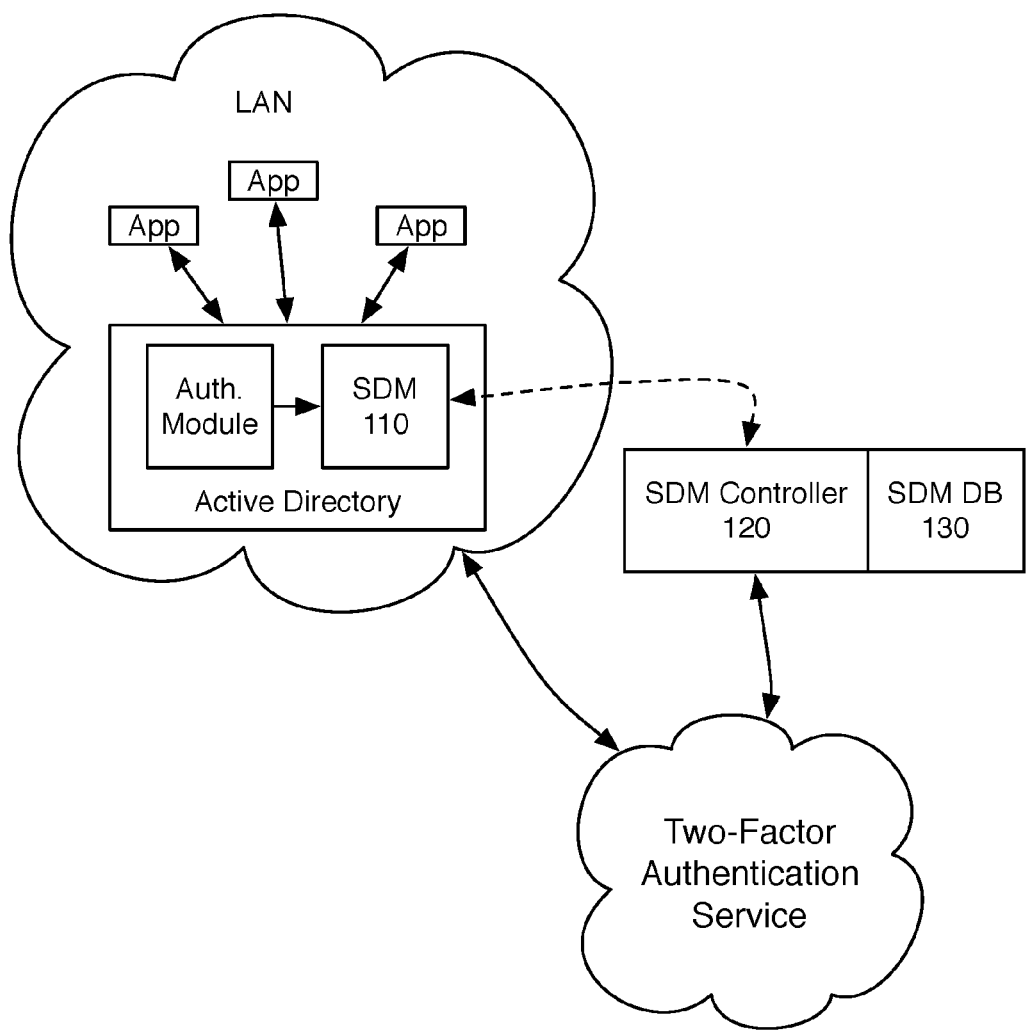
FIG. 2 is a schematic representation of a system of a preferred embodiment.

SDMs 110 may be located within networks for which service discovery is desired; additionally or alternatively, SDMs 110 may be located external to said networks. For example, an SDM 110 may be integrated with an active directory service, as shown in FIG. 2. Alternatively, an SDM 110 may be located in the cloud, and may communicate with a network's DNS server from an external location. If the SDM 110 is not physically located within a particular network, the SDM 110 may still locate itself virtually in the network (e.g., via VPN). Examples of each location type are as shown in FIG. 1. However, the SDM may reside in any suitable location for communicating with the SDM database 130, the SDM controller 120, a service in a network, and/or any suitable component.

SDMs 110 are preferably implemented as plugins to existing programs or services; for example, an SDM 110 may be implemented as an Active Directory software component (as shown in FIG. 2) or as a plugin for other services utilizing the Lightweight Directory Access Protocol (LDAP). SDMs 110 may additionally or alternatively be implemented as standalone scripts or programs; for example, an SDM 110 may be run on a dedicated server that monitors network traffic to detect services. As another example, an SDM 110 may be integrated with the SDM controller 120 (e.g., the SDM 110 may simply be a script or program run by the SDM controller 120 on the same systems the SDM controller 120 is run on). In a first variation, the system 100 can include a set of SDMs 110, where different SDMs of the set of SDMs 110 are implemented as different plugins to different existing programs or services. For example, the system 100 can include a set of SDMs 110, where a first SDM 110' of the set of SDMs operates as a plugin associated with traffic monitoring software. A second SDM 110" of the set of SDMs 110 can operate as a plugin associated with an Active Directory service. The set of SDMs 110 can collect service behavioral data from various services, and an SDM controller 120 can generate service behavioral characteristics based on the service behavioral data in order to identify services present on the network.

In a second variation, the system 100 can include a set of SDMs 110, where a first subset of SDMs are implemented as plugins to existing programs or services, and a second subset of SDMs are implemented as standalone scripts or programs. In a specific example of the second variation, an SDM of the first subset of SDMs can be implemented as a software plugin to network traffic monitoring software, such that the SDM can collect service behavioral data received by the network traffic monitoring software. In this specific example, an SDM of the second subset of SDMs can be implemented as a standalone script that can be executed by the SDM controller 120 for transmitting DNS queries to DNS servers. HTTP requests can be transmitted to any resolved IP addresses resulting from the DNS queries. DNS query responses and HTTP request responses can be used as service behavioral data upon which the service behavioral characteristics can be generated. Further service behavioral characteristics can be generated from the traffic monitoring data, and the set of service behavioral characteristics can be leveraged in identifying unknown services present on the network.

SDMs 110 are preferably implemented in software running on general-purpose computers, but may additionally or alternatively run on purpose-built hardware (or any suitable hardware). For example, a router or switch may include SDMs 110 designed to detect services based on network traffic characteristics. However, SDMs 110 can be additionally or alternatively implemented on an administrator device, user device, and/or other suitable device.

Figure 3B:
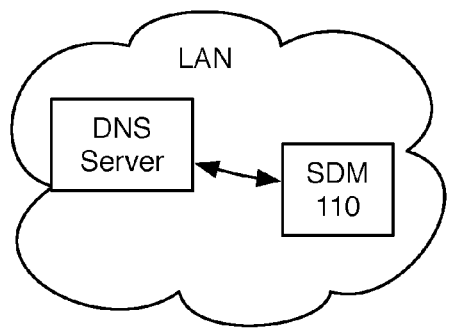
Figure 3B:
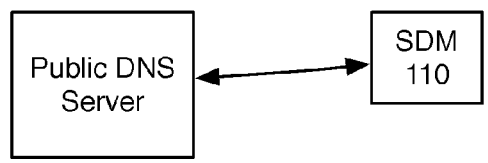
Figure 3B:
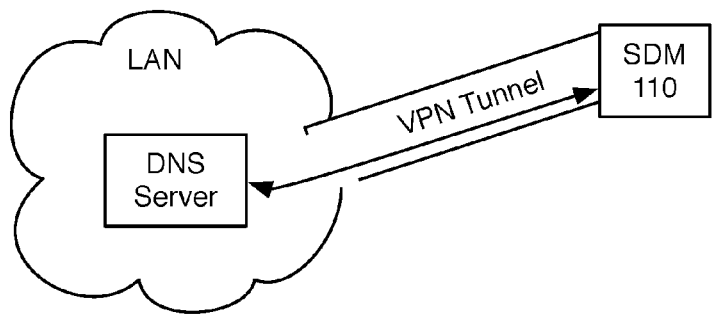
Figure 3C:
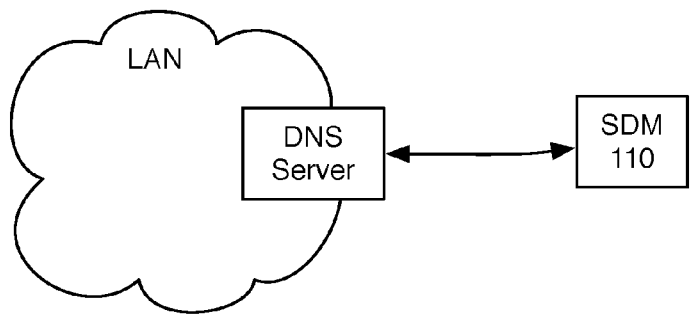

SDMs 110 may detect services in a variety of ways. In a first embodiment, an SDM 110 detects services based on responses to DNS queries. The SDM 110 may communicate with either or both of internal-facing DNS servers (as shown in FIGS. 3A and 3B) and external-facing DNS servers (as shown in FIG. 3C). SDM 110 DNS queries may be directed to a public DNS server, as shown in FIG. 3D, (e.g., the public Google DNS server at 8.8.8.8) or to specific DNS servers associated with company.com. In particular, DNS queries for a given network often provide different results if the DNS lookup is internal vs. external.

In this embodiment, the SDM 110 preferably performs DNS lookups for hostnames known or presumed to be associated with network services. For example, the SDM 110 may perform DNS lookups for a company (with associated domain company.com) at the following addresses: vpn.company.com, mail.company.com, and connect.company.com.

The hostnames queried by the SDM 110 are preferably stored in the SDM database 130, but may additionally or alternatively be stored locally in the SDM 110 or in any other suitable location.

The list of hostnames queried is dynamic; that is, it may be updated in light of new information. For example, the two-factor authentication server may update the SDM database 130 with new hostname data if an administrator added two-factor authentication for that service (and the hostname was previously unknown). Say an administrator adds two-factor authentication for a VPN service located at tunnel. company.com, the SDM database 130 may now include a hostname prefix of 'tunnel.*' along with 'vpn.*' where '*' represents the base-level domain.

Hostname data may additionally be generated by machine learning algorithms (or other heuristics). For example, if the hostname data contains a reference to vpn1.*, a heuristic algorithm may also add references to related hostnames (e.g., 'vpn2.*').

Not all hostnames contained within the SDM database 130 are necessarily queried. For example, if a VPN service is already known to be operating at vpn.company.com, the SDM 110 may not query additional hostnames associated exclusively with VPN services (e.g., tunnel.*).

The SDM 110 may additionally or alternatively identify hostnames used by a service known or assumed to be operable on a network by searching queried DNS hostnames for known hostnames associated with the service (e.g., if salesforce is assumed to be operable on a network, the SDM 110 may search for any DNS lookup containing 'sales'), by analyzing network traffic, or in any suitable manner.

If a DNS lookup results in a resolved IP address, the SDM 110 preferably then sends an HTTP request to that IP address to fingerprint the service or services associated with the IP address. If the DNS lookup (which may involve multiple DNS servers) results in multiple IP addresses, any set or subset of the IP addresses may be queried. In addition or alternative to HTTP requests, the SDM 110 may send any suitable request (e.g., ping or other ICMP request) or transmission to the IP address.

The response of the HTTP request (or other request/transmission) is preferably compared to a fingerprint dataset to determine the service operating at the queried IP address (e.g., Juniper VPN, Outlook Web Access). The fingerprint dataset is preferably located within the SDM database 130 but may additionally or alternatively be located in any suitable location. Like the hostname list, the fingerprint dataset is preferably dynamic, and may be updated by new data from connected services (in particular, a two-factor authentication service).

Fingerprints may be generated from the combination of multiple responses. For example, multiple HTTP requests may be sent, each with different characteristics (e.g., one normal HTTP request, one HTTP request with an improper protocol number, one HTTP request with an improper protocol specification), and the fingerprint may be synthesized from the responses to these multiple HTTP requests. Such a fingerprint may be synthesized in any manner. For example, each HTTP response may be compared to a fingerprint dataset, resulting in a set of characteristics being linked to each HTTP response. The fingerprint may then include all of these characteristics (e.g., the superset of the set of responses for each HTTP request). Additionally or alternatively, the fingerprint may include a subset of the superset; for example, if the set of characteristics comprises a set of potential services, the fingerprint may be the intersection or mode of that set. More specifically, if a first response is linked to service A, B, and C (via the fingerprint dataset), a second response is linked to service A, D, and F, and a third response is linked to service A, D, and Z, the synthesized fingerprint may be linked solely to service A.

Comparison of the HTTP request to the fingerprint database is preferably performed by the SDM controller 120; the SDM 110 sends the response data to the SDM controller 120, where the comparison is performed. Additionally or alternatively, comparison of the HTTP request may be performed locally by the SDM 110 or in any other suitable location.

Response data collected by the SDM 110 preferably originates from HTTP response headers, but may additionally or alternatively result from any suitable source. For example, the SDM 110 may capture how many times a particular response is sent by a particular server in a span of time. Response data may additionally or alternatively include any data received in response to a query or other probe by the SDM 110.

Response data collected by the SDM 110 is preferably intended to aid in fingerprinting services, but the SDM 110 may additionally or alternatively capture other data; for example, service version numbers (e.g., to determine if the service is up to date).

In a variation of the first embodiment, the SDM 110 may additionally or alternatively use data from the DNS query response for fingerprinting. For example, a DNS query response may include SPF (sender policy framework) data. SPF data may be used to determine the presence of certain services; e.g., "include:salesforce.com include:zendesk.com . . . " might indicate that a network uses Salesforce and Zendesk applications. Similarly to HTTP response data, SPF data (or other DNS response data) may be compared to fingerprinting data stored in the SDM database 130 (or any other suitable source).

In a second embodiment, an SDM 110 detects services by monitoring authentication attempts to an Active Directory service (or SAML, OpenID Connect, or any other identity provider), as shown in FIG. 2. In this embodiment, the SDM 110 is preferably a plugin or software component operating as part of the identity provider; additionally or alternatively, the SDM 110 may be implemented in any suitable manner. SDMs 110 can collect characteristics and/or metadata regarding the authentication attempts, including: user data associated with users attempting to authenticate (e.g., authorization level associated with the relevant user account, devices associated with the user account, service usage by the user account, etc.), service characteristics, success or failure of the authentication attempt, temporal characteristics (e.g., frequency of authentication attempts within a time frame, frequency of authentication attempts from a given user, timestamp of authentication attempts), and/or any other suitable authentication attempt characteristic.

Authentication attempts, characteristics of authentication attempts, and/or other data collected by identity providers are preferably compared to a fingerprint dataset to determine the service attempting authentication. The fingerprint dataset is preferably dynamic, and may be updated by new data from connected services (in particular, a two-factor authentication service).

Fingerprints may be generated from the combination of multiple authentication attempts. Comparison of captured data to the fingerprint dataset is preferably performed by the SDM controller 120; the SDM 110 sends the response data to the SDM controller 120, where the comparison is performed. Additionally or alternatively, comparison of the captured authentication data may be performed locally by the SDM 110 or in any other suitable location.

In a third embodiment, an SDM 110 detects services by monitoring network traffic. In this embodiment, the SDM 110 is preferably a plugin or software component operating as part of a network traffic monitor; additionally or alternatively, the SDM 110 may be implemented in any suitable manner.

Network traffic characteristics (e.g., from analysis of source, destination, time of transmission, time of reception, packet contents, packet headers, etc.) are preferably compared to a fingerprint dataset to determine services being used. For example, if there is a substantial amount of network traffic directed to greenhouse.io, this may indicate that the Greenhouse recruiting service is in operation on the network. The fingerprint dataset is preferably dynamic, and may be updated by new data from connected services (in particular, a two-factor authentication service).

Fingerprints are preferably generated from multiple network traffic data points. Comparison of captured data to the fingerprint dataset is preferably performed by the SDM controller 120; the SDM 110 sends the response data to the SDM controller 120, where the comparison is performed. Additionally or alternatively, comparison of the captured authentication data may be performed locally by the SDM 110 or in any other suitable location. Captured data may include any suitable network traffic data (e.g., source, destination, time, content, etc.). Captured data may be captured from packet headers, packet content (through deep packet inspection), or any other suitable source.

Network traffic data is preferably captured and analyzed in real-time by the SDM 110; additionally or alternatively, the SDM 110 may analyze data collected by other sources.

For instance, an SDM 110 may read log files from a router or switch and capture network traffic data from the logs (rather than from the data itself).

Digital fingerprints and/or service behavioral characteristics can be generated from any amount of and/or combination of DNS query response data, HTTP response data, authentication attempt to Active Directory service data, network traffic data, and/or any other suitable type of data. However, any suitable type of data relevant to service discovery and/or protection can be collected by SDMs 110 and used in generating service behavioral characteristics and/or digital fingerprints.

1.3 Service Discovery Module Controller

The SDM Controller 120 serves as the interface between SDMs 110 and external services (e.g., a two-factor authentication service). The SDM controller 120 preferably controls configuration options for SDMs 110. Configuration options preferably include any data relevant to SDM operation; for example, for a DNS querying SDM 110, configuration options may include where to grab hostname lists from, what HTTP queries to send to resolved addresses, etc.

Configuration options preferably include settings that dictate when SDMs 110 are run. For example, an SDM 110 may be configured to run only once (e.g., when a user first signs up for a two-factor authentication service). Alternatively, SDMs 110 may be run manually (e.g., in response to a user-set flag received by the SDM controller 120) or automatically in the background periodically (e.g., every week or for every 10 TB transferred through some network gateway) or constantly. Configuration options can be predetermined (e.g., by a network administrator, by a 2FA service provider, by a user, etc.), automatically determined (e.g., adjusted based on available network bandwidth, adjusted based on service-specific performance capabilities, adjusted based on time of day, etc.), updated, and/or otherwise determined.

The SDM controller 120 is preferably located in a cloud computing system independent of company networks; additionally or alternatively, the SDM controller 120 may be located within a company LAN or in any other suitable location. The SDM controller 120 is preferably communicatively coupled to the SDM database S130 and one or more SDMs 110. However, the SDM controller 120 can communicate with any suitable component.

The SDM controller 120 can preferably generate service behavioral characteristics from service behavioral data collected by one or more SDMs 110; analyze the service behavioral characteristics using expected service behavioral characteristics, resulting in a behavioral analysis; and identify a service identity of at least one service operating on the network from the behavioral analysis and an association of the service identity and the expected service behavioral characteristics. However, the SDM controller 120 can be configured to perform any suitable process.

The SDM controller 120 preferably identifies services based on captured data (as described previously) by comparing data from SDMs 110 to stored fingerprint data (e.g., in the SDM database 130). Additionally or alternatively, the SDM controller 120 may receive service identification data from SDMs 110 (i.e., the SDM 110 identifies the service) or the SDM controller 120 may pass on captured data to an external service without performing service identification (e.g., the SDM controller 120 sends data to an external service such as a 2FA service, which in turn performs service identification).

If the SDM controller 120 performs service identification, the SDM controller 120 may pass that information on to external services in a variety of ways. For instance, the SDM controller 120 may simply send a list of identified services to a two-factor authentication service. Additionally or alternatively, the SDM controller 120 may direct an external service to perform a particular task, or the SDM controller 120 may perform that task itself. For example, the SDM controller 120 may direct a two-factor authentication service to email administrators with a list of identified services, or the SDM controller 120 may query the two-factor authentication service to receive a list of administrator email addresses and then email administrators directly with a list of identified services.

In a variation of a preferred embodiment, the SDM controller 120 may additionally perform some automatic implementation of two-factor authentication. Automatic implementation may include any suitable aid to two-factor authentication setup; for example, pre-filling out some fields in a two-factor authentication configuration form. In some cases, automatic implementation may include completely implementing two-factor authentication for a particular service, preferably based on user preferences stored by the two-factor authentication service.

Whether the SDM controller 120 performs automatic implementation or not is preferably determined by preferences stored by the 2FA service; some preferences may be user-specified (e.g., an Admin specifies that any detected service be automatically protected) or service-specified (e.g., the 2FA performs auto-protection for particularly sensitive services, while not doing so for less sensitive services).

The SDM controller 120 may also provide information to or perform tasks for administrators (or other users, or services) not directly related to two-factor authentication. For example, the SDM controller 120 may notify administrators that a particular detected service is out-of-date.

The SDM controller 120 preferably maintains the SDM database 130. For example, the SDM controller 120 may update data in the SDM database 130 based on data received from the SDMs 110 or from external services.

In a variation of a preferred embodiment, the system 100 does not include an SDM controller 120; in this variation, tasks performed by the SDM controller 120 may be performed by the SDMs 110 or by an external service (e.g., 2FA service).

2. Method for Automatic Service Discovery and Protection

As shown in FIGS. 5-8, a method 200 for automatically discovering services operating on a network includes storing expected service behavioral characteristics and service identities of services operating on the network S210, collecting service behavioral data S220, generating service behavioral characteristics from the service behavioral data S230, analyzing the service behavioral characteristics using the expected service behavioral characteristics S240, and identifying a service identity of at least one service operating on the network S250. As shown in FIGS. 5-9, the method 200 can additionally or alternatively include generating a service discovery notification S260, and/or implementing security measures with identified services S270.

The method 200 functions to detect services used in a network (or multiple networks) that may benefit from increased security (e.g., by implementation of two-factor authentication). The method 200 may detect services using a variety of techniques, described in more detail below. After detecting services, the method 200 generates notifications that may be used by system administrators or external services to identify services in need of protection (e.g., by 2FA). The method 200 may additionally or alternatively perform automatic implementation of security measures for detected services. Any portion of the method 200 can be performed by any suitable service discovery component, including one or more SDMs, SDM controllers, and/or SDM databases. Additionally, or alternatively, any portion of the method 200 can be performed by a device associated with an administrator or a user, by a service on a network, and/or any other suitable component.

Figure 6:
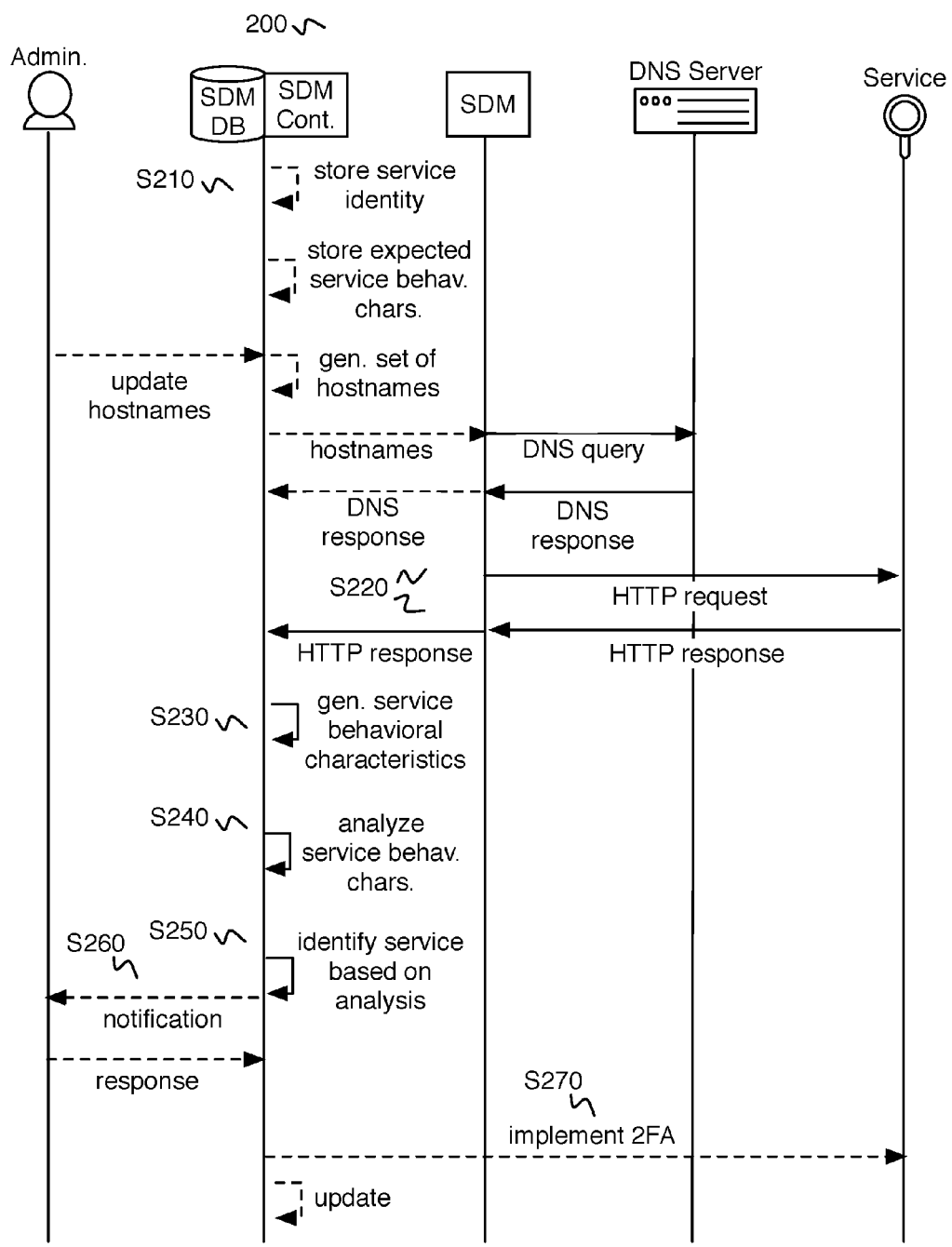
FIG. 6 is a schematic flow diagram of a method of a preferred embodiment.
Figure 10:
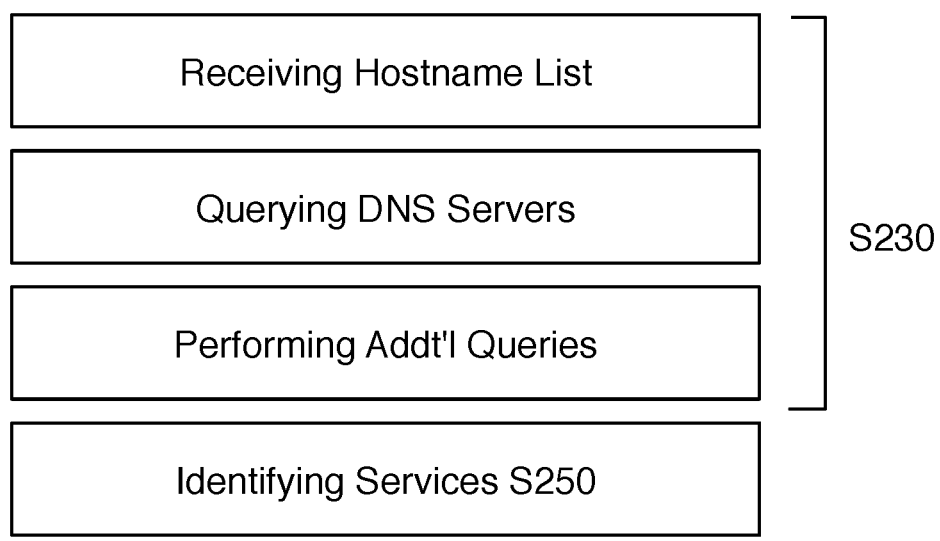
FIG. 10 is a schematic flow diagram of a service discovery step of a method of a preferred embodiment.

The method 200 may include discovering services in a variety of ways. In a first embodiment, as shown in FIGS. 6 and 10, the method 200 includes discovering a service by a process such as the following:
 a. Receiving a list of hostnames to query;
 b. Querying DNS servers with the list of hostnames;
 c. Performing additional queries to addresses identified by DNS servers; and
 d. Identifying service based on query responses.

Service discovery in this embodiment is substantially similar to the description of these steps in the paragraphs describing the first embodiment of the system 100.

Figure 7:
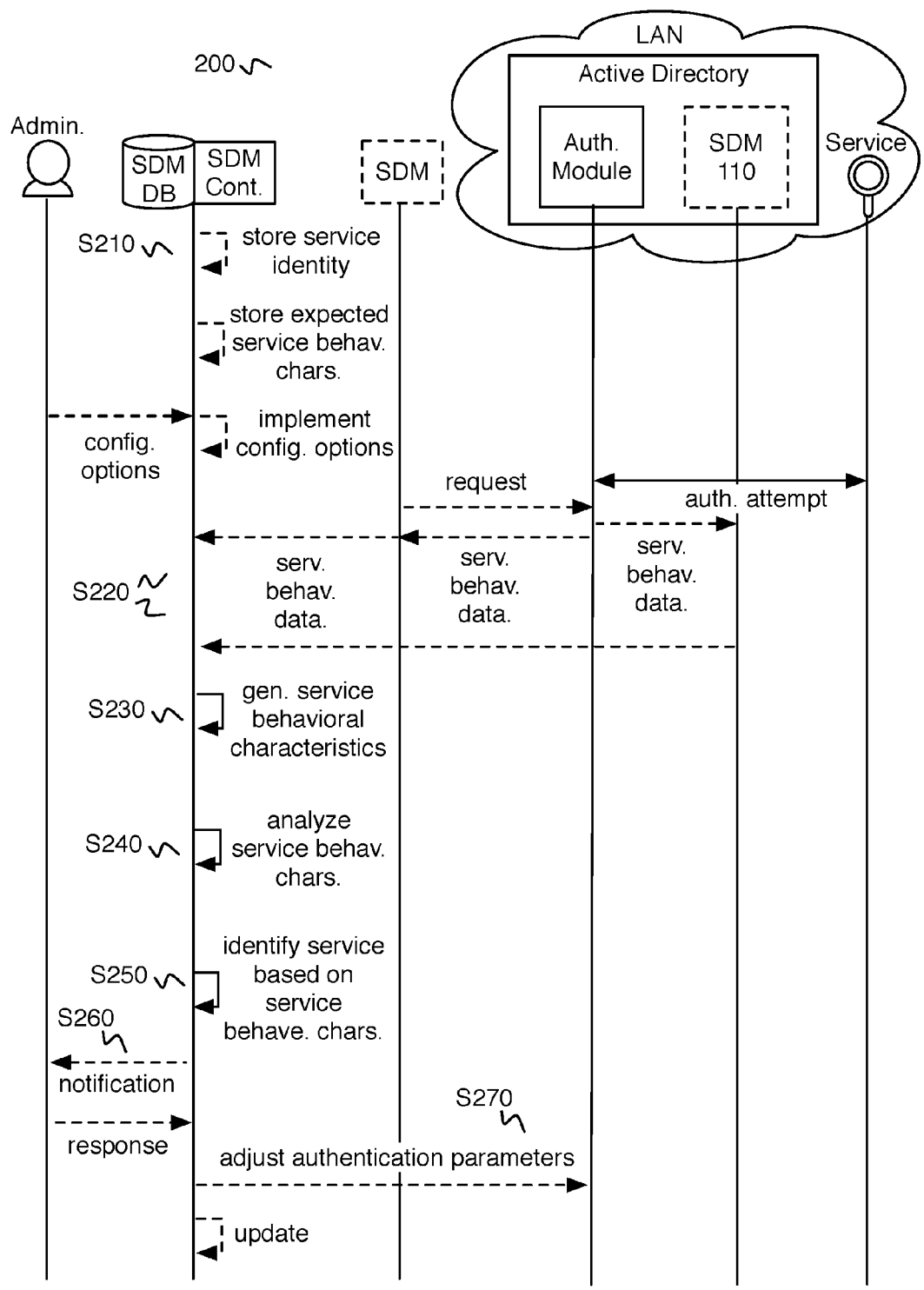
FIG. 7 is a schematic flow diagram of a method of a preferred embodiment.
Figure 11:
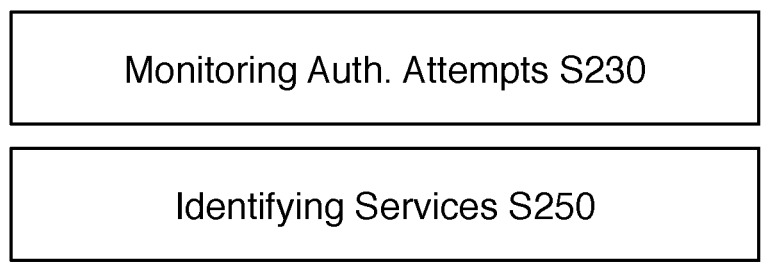
FIG. 11 is a schematic flow diagram of a service discovery step of a method of a preferred embodiment.

In a second embodiment, as shown in FIGS. 7 and 11, method 200 includes discovering a service by a process such as the following:
 a. Monitoring authentication attempts to an identity provider; and
 b. Identifying service based on authentication attempt data.

Service discovery in this embodiment is substantially similar to the description of these steps in the paragraphs describing the second embodiment of the system 100.

Figure 8:
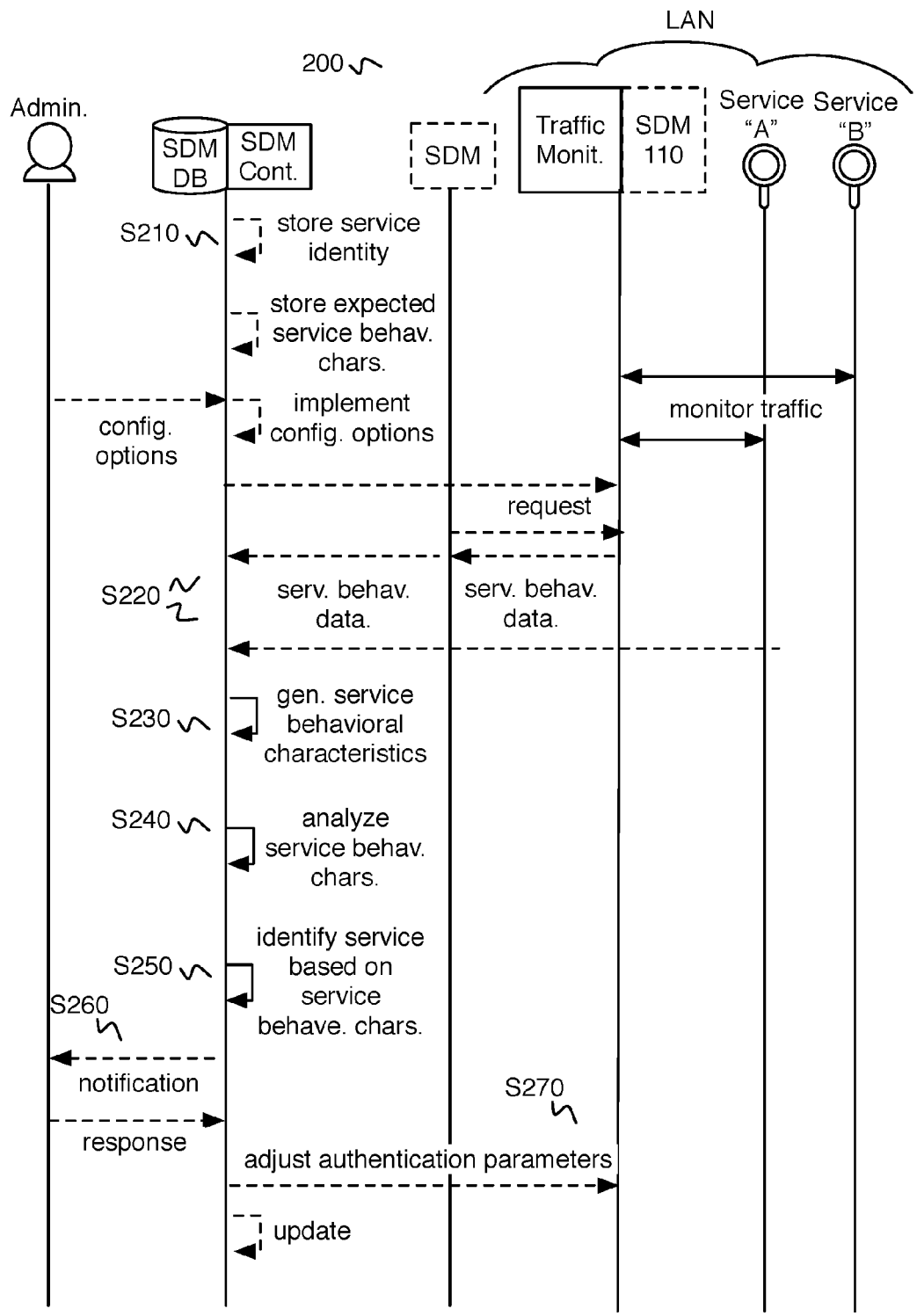
FIG. 8 is a schematic flow diagram of a method of a preferred embodiment.
Figure 9:
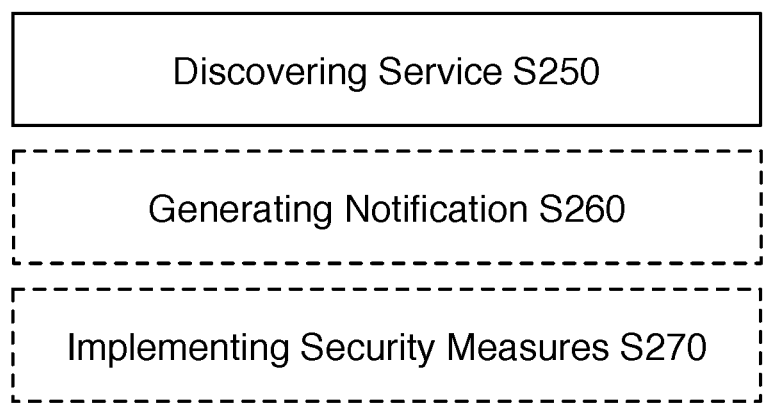
FIG. 9 is a schematic flow diagram of a method of a preferred embodiment.
Figure 12:
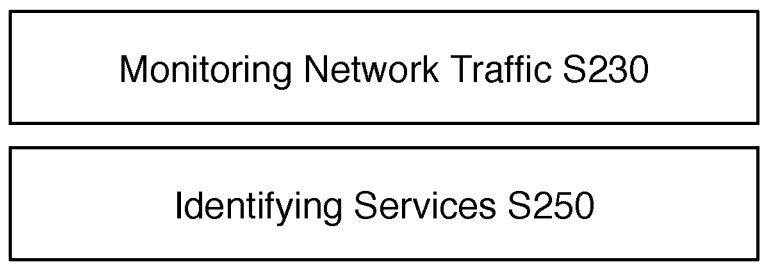
FIG. 12 is a schematic flow diagram of a service discovery step of a method of a preferred embodiment.

In a third embodiment, as shown in FIGS. 8 and 12, method 200 includes discovering a service by a process such as the following:
 a. Monitoring network traffic; and
 b. Identifying service based on network traffic data.

Service discovery in this embodiment is substantially similar to the description of these steps in the paragraphs describing the third embodiment of the system 100. However, any suitable processes can be performed in discovering a service.

2.1 Storing Data Relevant to Service Discovery and/or Protection

Step S210 recites: storing expected service behavioral characteristics and service identities of services operating on the network S210, which functions to maintain data used in identifying services and/or protecting services. Storing data relevant to discovery and/or protection is preferably performed by an SDM database. Additionally or alternatively, data can be stored by an SDM, components of an SDM controller, a device associated with an administrator and/or user, and/or any other suitable component.

In relation to Step S210, stored data preferably includes service behavioral data collected by SDMs, and/or service behavioral characteristics received from an SDM controller. Additionally or alternatively, data to be stored can be received from services operating on the network, services outside the network, external third party sources (e.g., service providers offering identifying information regarding their service), an administrator, a user, and/or another suitable entity. However, data relevant to service discovery and/or protection can be can be received from and or communicated to any suitable component.

Regarding Step S210, data stored by an SDM database can include service behavioral data, service behavioral characteristics, service identities, models, 2FA preferences, administrator preferences, user preferences, administrator data, user data, device data, and/or any suitable type of data. For example, an SDM database can store a set of expected service behavioral characteristics and a set of service identities associated with the set of expected service behavioral characteristics, such that the information can be received and leveraged by an SDM controller in identifying unknown services on a network.

2.2 Collecting Service Behavioral Data

Step S220 recites: collecting service behavioral data S220, which functions to collect service behavioral data concerning services operating on a corporate local area network (or any other network or set of networks) in order to identify the services that may benefit from particular security measures. These particular security measures preferably consist of two factor authentication implementations, but may additionally or alternatively comprise any suitable security measures. For example, Step S220 may be used to detect not only that a service is being used by a network, but also that the version of that service is outdated (leading to potential vulnerability).

Step S220 is preferably performed by plugins to existing programs or services; for example, Step S220 may be performed by software implemented as an Active Directory software component or by a plugin for other services utilizing the Lightweight Directory Access Protocol (LDAP). Step S220 may additionally or alternatively be performed by standalone scripts or programs; for example, Step S220 may be performed by a dedicated server that monitors network traffic to detect services. As such, Step S220 can be performed by one or more SDMs. Additionally or alternatively, Step S220 can be performed by one or more SDM controllers and/or any other suitable component. However, different components can perform different portions of Step S220, and any suitable component can perform any suitable portion of Step S220.

Regarding Step S220, an SDM controller can control one or more SDMs to collect service behavioral data concerning services on a network. The timing of the data collection can be predetermined (e.g., based on time intervals such as collection every second, every minute, every hour, every day, etc.), established based on configuration options selected by a user and/or administrator (e.g., an administrator sets a preference for the SDMs to collect service behavioral data passively and continuously, etc.), dynamic (e.g., based on network performance characteristics, based on more network traffic being observed than normal, based on more authentication requests to an Active Directory service than normal, based on unrecognized authentication attempts, based on types of network traffic monitored, based on event data from other services, etc.). Multiple types of data can be collected in parallel, in serial, or have any suitable temporal relationship. Further, any suitable amount of any suitable data type can be collected at any given time. For example, global network traffic monitoring data can be collected for all services present on a network while authentication attempt data regarding only a subset of services are collected. However, SDMs can collect any suitable service behavioral data at any suitable time and/or frequency.

With respect to Step S220, collected data can include any combination of one or more of: HTTP response data, IP addresses, hostnames, DNS query response data, service data associated with users of the service, Active Directory service data, service behavioral data received from external services, and/or any other suitable type of service behavioral data. However, any suitable type of data and any amount of such data can be collected.

In a first variation, Step S220 can include passively collecting service behavioral data. In this variation, passively collecting service behavioral data can include collecting data without transmitting probes requesting a response from different entities inside and/or outside the network. For example, a SDM plugin integrated with an Active Directory service can monitor all failed authentication requests to the Active Directory service, which can then be used as service behavioral data without needing to transmit any specific data probes to services. In another example, a SDM plugin to a network traffic monitoring service can collect and log traffic from services over a timeframe without requiring the SDM controller to direct an SDM to request traffic logs from the network traffic monitoring service. However, passive collection of service behavioral data can otherwise be performed.

In a second variation, Step S220 can include actively collecting service behavioral data. In this variation, actively collecting service behavioral data includes receiving service behavioral data in response to data request probes transmitted to different entities inside and/or outside the network. For example, as shown in FIG. 6, a DNS request probe can be transmitted to a DNS server, and the subsequent response by the DNS server can be used as service behavioral data. In another example, resolved IP addresses can be queried with an HTTP request probe, and the subsequent HTTP responses can be used as service behavioral data. However, active collection of service behavioral data can otherwise be performed.

2.3 Generating Service Behavioral Characteristics

Step S230 recites: generating service behavioral characteristics from the service behavioral data, which functions to generate service behavioral characteristics regarding services on a network, where the service behavioral characteristics can be utilized in identifying services that can benefit from particular security measure. Generating service behavioral characteristics is preferably performed by one or more SDM controllers, but can additionally or alternatively be performed by one or more SDMs, devices associated with a user and/or administrator, and/or any other suitable component.

Regarding Step S230, Generating service behavioral characteristics preferably includes generating service behavioral characteristics based on collected service behavioral data. Generated service behavioral characteristics can include: raw service behavioral data, processed service behavioral data, analysis of service behavioral data, fingerprints based on service behavior data and/or associated analyses, and/or any other suitable type of service behavioral characteristic. However, generated service behavioral characteristics can be based on any combination of one or more of the above-discussed data types and/or any suitable data.

In a first variation of Step S230, generating service behavioral characteristics includes processing service behavioral data. Processing service behavioral data can result in data processed into a format for comparison with expected behavioral data, data converted into a feature format suitable for input into a machine learning model, compressed, filtered, and/or any other suitable processing mechanism. In a first example, HTTP responses can be parsed and specific portions of the HTTP responses (e.g., header fields, message body, etc.) can be extracted to be used as service behavioral characteristics. In a second example, processing service behavioral data can include: receiving a log of authentication attempts to services present on the LAN; and extracting information for services with a number of failed authentication attempts exceeding a threshold. In a third example, processing service behavioral data can include: receiving a log of network traffic for all services present on the LAN; and extracting network traffic data associated with services with unknown identities. However, service behavioral data can otherwise be processed in any suitable manner.

In a second variation of Step S230, generating service behavioral characteristics includes generating an analysis of service behavioral data. Generating an analysis can include: comparison to baseline metrics (e.g., comparing network traffic data to historic network traffic, etc.), mapping service behavioral data to more interpretable concepts (e.g., mapping authentication attempt raw data into a concern metric indicating potential unauthorized attacks, etc.), and/or any suitable analysis mechanism.

In a first example of the second variation, the HTTP headers, status codes, and message content can be analyzed to generated a single metric characterizing the type of HTTP response.

In a second example of the second variation, an authentication attempt metric can be generated based on a comparison between authentication attempts to an identity provider service on the network over a baseline timeframe (i.e., a timeline wherein the network is in a baseline state) and authentication attempts to the identity provider service over another timeframe (e.g., some timeframe after the baseline timeframe). The baseline state can be a state where there the state of services operating on the network is known (e.g., all of the services operating on the network are known, a threshold number of services operating on the network are associated with service identities, etc.). The other timeframe can be associated with a state of services operating on the network when the state of services is not fully known (e.g., when there is an added unknown service, when a service has been modified, when a service has been removed, etc.).

In a third example of the second variation, an authentication attempt metric can be generated based on a comparison between the amount of authentication attempts within the past 24 hours compared to the historic average amount of authentication attempts within a 24 hour timeframe.

In a fourth example of the second variation, a network traffic metric can be generated for a service based on the amount of bandwidth usage, the amount of users accessing the service, and the relative ratio of ingoing and outgoing traffic through the service. In a fourth example, a security concern metric can be generated based on an analysis of vulnerability to unauthorized attacks on the network through the service. However, any suitable analysis of service behavioral data can be performed in generating any suitable service behavioral characteristic.

Temporally, Step S230 is preferably performed in response to and/or after collecting predetermined types of service behavioral data and/or service behavioral characteristics. In a first example, Step S230 can include, in response to collecting HTTP responses responding to each of the HTTP request probes transmitted, generating service behavioral characteristics based on the HTTP responses. In a second example, Step 230 can include, after receiving a log of authentication attempts to an Active Directory service and a log of network traffic over the last 24 hours, generating service behavioral characteristics based on the log of authentication attempts and the log of network traffic. However, Step S230 can be performed in any suitable relation to other steps of the method 200, and/or can be performed at any suitable time.

Generating service behavioral characteristics can be performed in real-time as service behavioral data is received. For example, a first behavioral data probe (e.g., an HTTP request) can be transmitted substantially simultaneously as a second behavioral data probe (e.g., a request to traffic monitoring software for traffic monitoring data). A first set of service behavioral data derived from a response to the first behavioral data probe can be received and corresponding service behavioral characteristics can be generated for the first set of service behavioral data before receiving the second set of service behavioral data derived from a response to the second behavioral data probe. Once the second set of behavioral data is received, corresponding service behavioral characteristics can be generated. Alternatively, service behavioral characteristics can be generated only after receiving data stemming from responses to each of the behavioral data probes. However, any service behavioral characteristic can be generated at any time before, during, or after receiving any suitable service behavioral data, and/or at any suitable time.

With respect to Step S230, in a first variation, generating service behavioral characteristics can include weighting different types of collected service behavioral data. For example, in generating a HTTP response characterization to be used in analyzing with an expected HTTP response characterization, the types of HTTP headers and status codes can be weighted more heavily than the message content in the HTTP response. In another example, failed authentication attempts to an Active Directory Service can be weighted more heavily than an absolute amount of authentication attempts in generating an authentication attempt metric. In a third example, in generating a network traffic metric, the types of users accessing a particular service can be weighted more heavily than the amount of bandwidth associated with that service. However, any suitable weighting process can be used in generating service behavioral characteristics.

Regarding Step S230, in a second variation, generating service behavioral characteristics can include converting service behavioral data into a form of machine learning features suitable to be used for a machine learning model. For example, the occurrences of specific words in an HTTP response can be used as features associated with the service providing the HTTP responses. If the service identity associated with the service behavioral characteristics is known, the service identity can be used as a label for the feature set corresponding to the service, such that the label and the feature set can be used as training data in generating the machine learning model. If the service identity associated with the service behavioral characteristics is unknown—and the service is sought to be identified—a feature set can be generated based on the service behavioral characteristics, and the feature set can be used as test data to input into the machine learning model. However any suitable processing of service behavioral data can be performed in generating data to be used in a machine learning model.

2.4 Analyzing Service Behavioral Characteristics.

Step S240 recites: analyzing the service behavioral characteristics using the expected service behavioral characteristics S240, which functions to generate a behavioral analysis from which a service can be identified. One or more SDM controllers preferably analyze service behavioral characteristics. Additionally or alternatively, one or more SDMs, devices associated with a user and/or administrator, and/or any other suitable component can perform any suitable portion of Step S240.

Regarding Step S240, analyzing the service behavioral characteristics preferably results in generating a behavioral analysis. Generating a behavioral analysis is preferably based on service behavioral characteristics and/or data, expected service behavioral characteristics and/or data, weights associated with service behavioral characteristics, data stored in the SDM database, and/or any other suitable type of data. However, analysis of the service behavioral characteristics can be based on any suitable input and/or produce any suitable output. For example, generating a behavioral analysis can include comparing generated service behavioral characteristics to expected service behavioral characteristics associated with a service identity.

With respect to Step S240, analyzing the service behavioral characteristics is preferably performed after generating the service behavioral characteristics. Additionally or alternatively, a behavioral analysis can be generated based on the collected service behavioral data after receiving the data. However, Step S240 can be performed at any suitable time in relation to any other portion of the method 200. Analysis of service behavioral characteristics can be contingent on conditions including: types, size, number, and/or content of collected service behavioral characteristics, and/or any suitable condition. For example, analyzing the service behavioral characteristics can be in response to an amount of generated service behavioral characteristics exceeding a threshold number. However, analyzing the service behavioral characteristics can be contingent on any suitable condition and/or event.

Analyzing service behavioral characteristics can be performed in real-time as service behavioral data and/or characteristics are received for different services. For example, a first behavioral analysis can be generated for a set of service behavioral characteristics associated with a service. As more service behavioral data is collected for the service, subsequent service behavioral characteristics can be generated, and the set of service behavioral characteristics can be updated. A second behavioral analysis can then be generated from the updated set of service behavioral characteristics for the service. In another example, service behavioral characteristics are generated for multiple different services, and such characteristics can be analyzed in parallel. Additionally or alternatively, a first set of service behavioral characteristics belonging to a first service is analyzed before moving on to analyzing a second set of service behavioral characteristics associated with a second service.

In a first variation of Step S240, analyzing the service behavioral characteristics can include calculating a numerical change between numerical generated service behavioral characteristics and numerical expected service behavioral characteristics. The calculation can be based on numerical data and/or non-numerical data mapped to numerical quantities. Based on the amount, type, and/or other characteristic of the numerical change, service identity probabilities can be determined regarding whether an unidentified service corresponds to a particular service identifier. Additionally or alternatively, service identity probabilities can be generated based on amounts of changes for different types of service behavioral characteristics. However, any suitable numerical change characteristic can be used in generating a service identity probability. In a first example of the first variation, a similarity score can be calculated between a current network bandwidth usage and an expected network bandwidth usage globally and/or for specific services operating on the network. In a second example of the first variation, a behavioral analysis can be generated that includes a similarity score between an absolute volume of authentication attempts to an Active Directory service and an expected volume. Such similarity scores can be used in generating a service identity probability. In a third example, a numerical change can be calculated between the actual failed authentication attempts to an Active Directory service and the expected number of failed authentication attempts. However, any suitable numerical change characteristic can be generated based on any suitable numerical data.

In a second variation of Step S240, analyzing the service behavioral characteristics can include analyzing non-numerical differences between service behavioral characteristics and expected service behavioral characteristics. Analyzing non-numerical differences can be based on non-numerical data (e.g., HTTP response header content) or numerical data mapped to non-numerical data (e.g., different bands of network traffic volume mapped to "low", "medium", and "high" amount of traffic, etc.). In an example, service identity probabilities (e.g., the probability that an unknown service corresponds to a particular service identity) can be calculated based on an analysis of what was received in the HTTP response versus what was expected. In this example, probabilities can be calculated based on a binary result (e.g., the headers were different or the headers were the same between the actual and the expected HTTP responses, etc.) and/or non-binary result (e.g., status code "A" was received when status code "C" was expected, etc.). However, any suitable non-numerical change characteristic can be generated based on any suitable numerical data.

In a third variation of Step S240, analyzing the service behavioral characteristics can include generating a digital fingerprint based on service behavioral characteristics, and/or analyzing a generated digital fingerprint using an expected digital fingerprint. A digital fingerprint can include any combination of one or more of: service behavioral characteristics, service behavioral data, any other suitable data, and/or weighted forms of such data. Multiple data points of a service behavioral characteristic type can be used in generating an expected service behavioral characteristic for that type. For example, multiple data points of network traffic within 24 hour periods can be used in generating an average expected amount of network traffic for a given 24 hour period. The expected service behavioral characteristics for the service behavioral characteristic types are preferably used in generating a digital fingerprint for an unknown or known service. Digital fingerprints generated for an unknown service are preferably compared to digital fingerprints associated with known services, thereby generating a behavioral analysis to be used in identifying the unknown service. However, any number or types of digital fingerprints can be compared and/or otherwise processed in generating a behavioral analysis.

In a fourth variation of step S240, analyzing the service behavioral characteristics can include generating a model for analyzing service behavioral characteristics. Models can be generated from: expected service behavioral data, expected service behavioral characteristics, associated service identities, and/or any other suitable data. Model inputs can include: service behavioral data, service behavioral characteristics, and/or any other suitable inputs. Model outputs can include: a service identifier, associated probabilities indicating the probability that the service identifier correctly matches the unknown service, recommendations that a particular identified service be implemented with 2FA, and/or any other suitable model output. A single model can apply to all model inputs potentially input into the model. Additionally or alternatively, different models can be generated for different service IDs, service types, service features, and/or any other suitable service identifier. However, the numerical relationship between models, service identifiers, and/or service behavioral characteristic types can otherwise be defined.

In a first example of the fourth variation, a model is generated from an algorithm incorporating multiple data points of multiple service behavioral characteristics known to be associated with a particular service identifier. Test service behavioral characteristics (e.g., associate with an unknown service), can be input into the model, and the model can output an indication of whether the service identifier applies to the unknown service. In a specific example, a model for service "A" can be generated from a set of HTTP responses generated from a set of HTTP requests to service "A". HTTP requests can be sent to unknown Service "B", and the corresponding HTTP responses can be input into the model to obtain an indication as to the likelihood of unknown Service "B" being identified as service "A".

In a second example of the fourth variation, a machine learning model can be generated and used in analyzing service behavioral characteristics. As previously discussed, training data (e.g., a set of known service labels associated with feature sets generated from service behavioral characteristics) can be used in training the model. A feature set can be created from generated service behavioral characteristics associated with an unknown service. The feature set can be input into the machine learning model to generate an indication as to one or more service identifiers the apply to the unknown service.

The second example of the fourth variation and/or any other suitable portion of the method 200 employing machine learning can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 200 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 200.

2.5 Identifying a Service.

Step S250 recites: identifying a service identity of at least one service operating on a network S250, which functions to determine a service identifier associated with a service. Identifying a service identity is preferably performed by an SDM controller, but can additionally or alternatively be performed by one or more SDMs, devices associated with a user and/or administrator, and/or any other suitable component.

Regarding Step S250, identifying a service identity can include determining, for the unknown service: a service ID, a service type, a service feature, any other suitable identifier, and/or likelihoods of identifiers applying to a service. Identified service identities and corresponding service behavioral characteristics are preferably stored in the SDM database and/or any other suitable component. Additionally or alternatively, associated service behavioral data, associated user data, associated device data, and/or any suitable data can be stored in association with the identified service identity. Likelihoods of identifiers applying to a service can be determined as numerical probabilities (e.g., 85% chance that the unknown service is Service "A", etc.), verbal likelihoods (e.g., "High" likelihood that unknown service is a messaging service, etc.), and/or any other suitable form indicating a likelihood. Service identifiers and/or likelihoods can be determined for every service present on a network, a subset of services present on the network (e.g., only unknown services), and/or any service within or outside the network.

Identifying a service identity S250 is preferably performed from a behavioral analysis generated as in Step S240 and an association of a service identity and expected service behavioral characteristics. However, identifying a service identity can otherwise be performed based on any suitable data.

Identifying a service identity S250 is preferably performed in response to generating a behavioral analysis, but can additionally or alternatively be performed before, during, and/or after any suitable portion of the method 200, and/or at any suitable time. Identifying services can be performed in real-time as service behavioral analyses are generated. However, identification of services based on behavioral analysis can be performed in parallel, in serial, and/or in any suitable order.

In a variation, identifying a service identity S250 includes: identifying a service identity of at least one service operating on the network from a behavioral analysis and an association of the service identity and the expected service behavioral characteristics.

2.6 Generating a Service Discovery Notification.

Step S260 recites: generating a service discovery notification, which functions to generate notifications regarding discovered services S260 (and/or other data relevant to security; e.g., service version number). Generating a service discovery notification is preferably performed by an SDM controller, but can additionally or alternatively be performed by an SDM and/or any other suitable component. Generating a service discovery notification can preferably include transmitting the service discovery notification to a device associated with an administrator and/or user. The device can be part of the network in which an SDM controller operates, or can be outside the network. Transmission of a service discovery notification can be performed by an SDM controller and/or any other suitable component. However, any suitable component can generate a service discovery notification, transmit a service discovery notification, and/or receive a service discovery notification.

Generating a service discovery notification can be in response to and/or after identifying any number of unknown services (e.g., in response to a number of newly identified services exceeding a threshold), identifying a service possessing a particular service type (e.g., in response to identifying any communication-based services), identifying a service possessing a particular security risk (e.g., a service with authorization to sensitive information contained on the network), and/or identifying any suitable service identifier and/or characteristic. Additionally or alternatively, generating a service discovery notification can be performed at determined time intervals (e.g., every day, week, etc.), which can be independent of whether there was a newly identified service (e.g., a notification can indicate that no newly identified services were discovered). Additionally or alternatively, generating a service discovery notification can be based on administrator and/or user configuration options, which can be used to determine the timing, frequency, form, content, options, and/or any other characteristic of the service discovery notifications. However, generating service discovery notifications can be performed at any suitable time.

With respect to Step S260, notifications can be transmitted through wireless communicable links (e.g., Bluetooth, WiFi, etc.), a wired communicable link, and/or any suitable connection between devices.

Figure 4A:
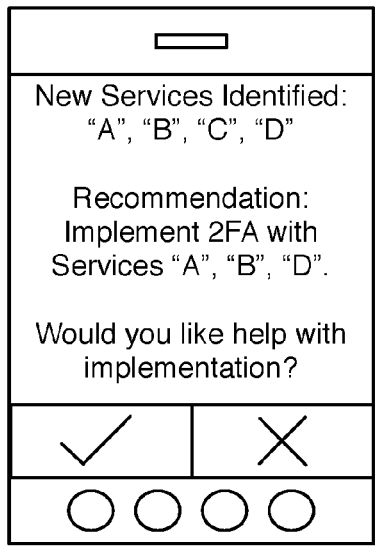
FIGS. 4A, 4B, and 4C are schematic representations of service discovery notifications.
Figure 4B:
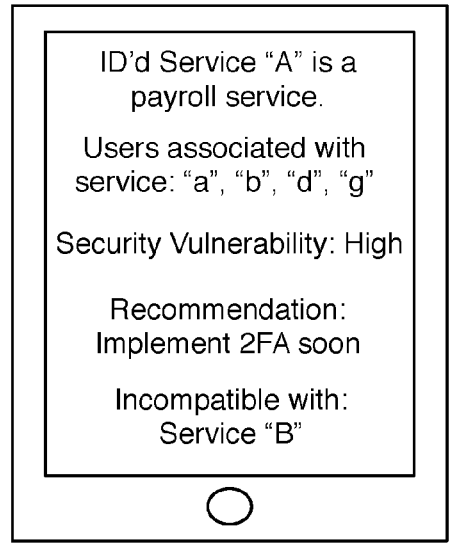
Figure 4C:
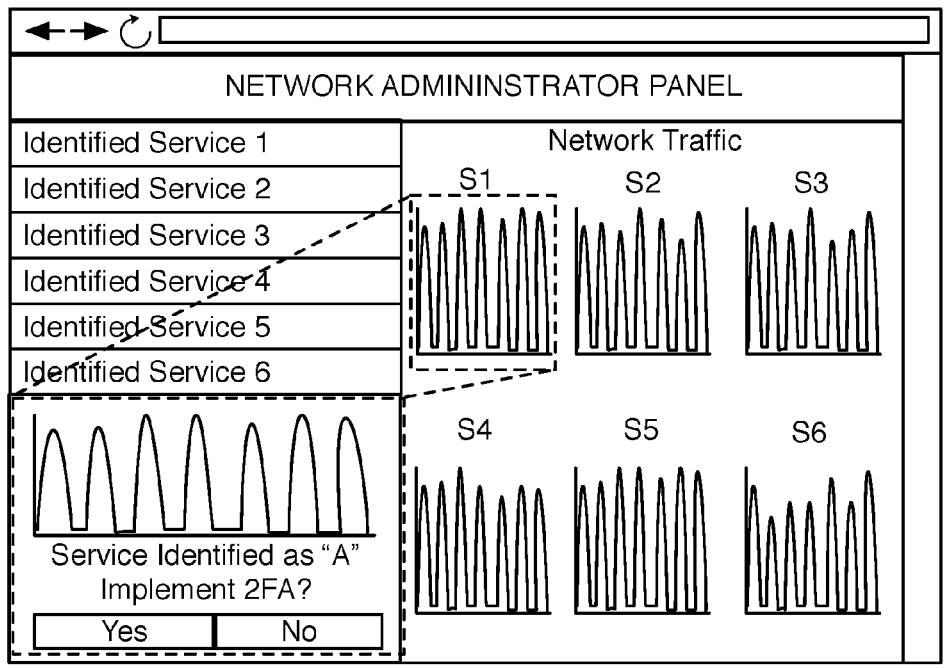
Figure 5:
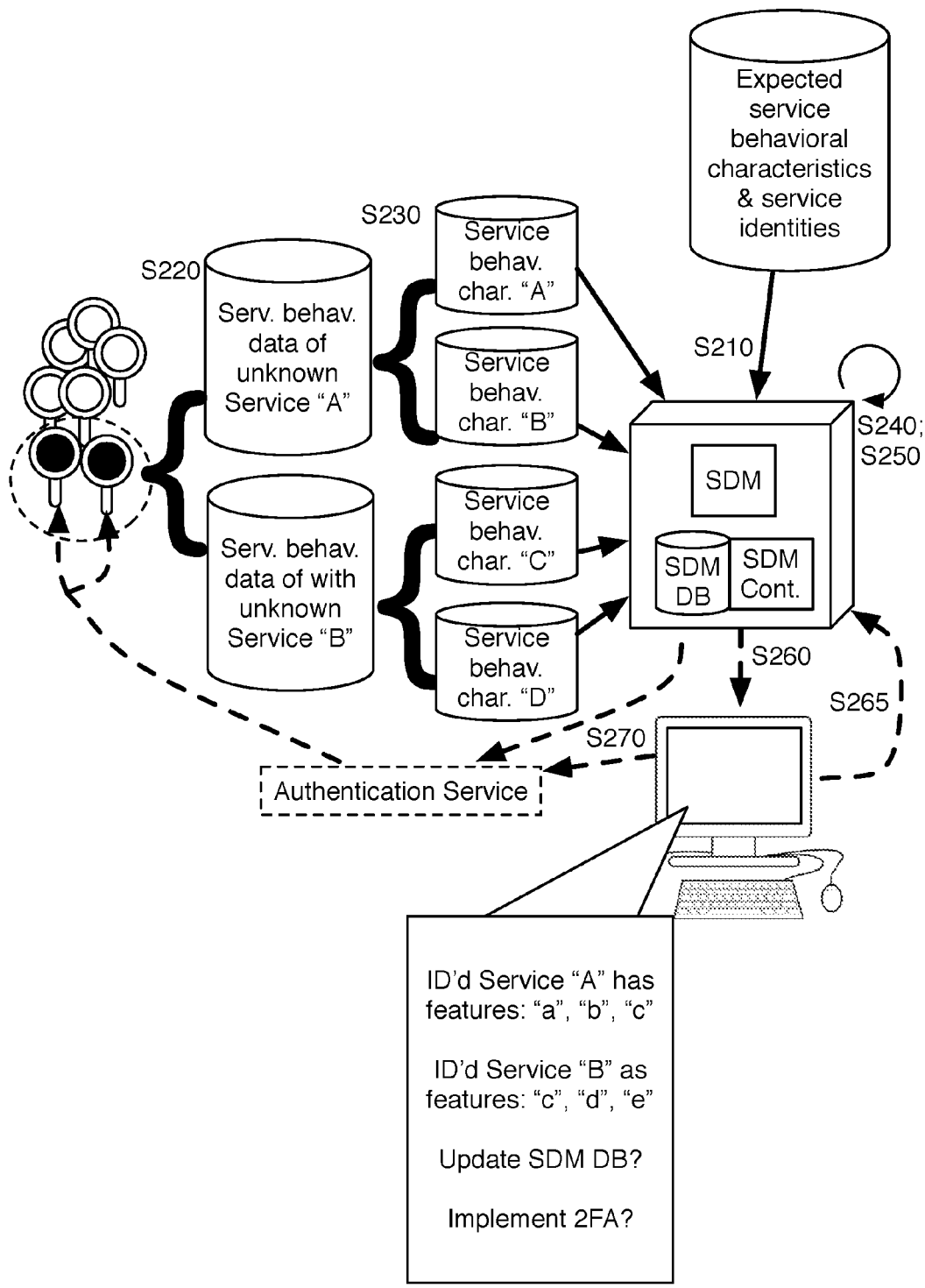
FIG. 5 is a schematic representation of a method of a preferred embodiment.

Regarding Step S260, as shown in FIGS. 4A-4C, notification content can include: services identified, services recommended to use with 2FA, concern metrics for services based on their level of vulnerability to unauthorized attacks, types of 2FA that can be implemented with the identified service, information not associated with 2FA (e.g., outdated version, incompatibilities between services present on the network, traffic information, etc.), and/or any other suitable information In a variation of Step S260, generating a service discovery notification can include presenting an option for an administrator and/or user to verify that the identified service was identified correctly. For example, a generated notification indicating an identified service can be transmitted to an administrator who can investigate the identified service. The notification can include an option for the administrator to confirm or deny the accuracy of the service identification. As shown in FIG. 5, responses to such options can be used in updating SDM components S265, such as updating an SDM database, updating a model, updating an expected digital fingerprint, and/or can be used for any other suitable purpose. For example, a generated behavioral analysis (e.g., a behavioral analysis upon which a service identity can be identified) can comprise an evaluation of a set of service behavioral characteristics using a model generated from expected service behavioral characteristics. The model can be configured to be updated with the set of service behavioral characteristics only after verification (e.g., by an administrator) of the link between the set of service behavioral characteristics and the identified service identity.

Step S260 may include generating service notifications in a variety of ways. For example, Step S260 may include sending a list of identified services to a two-factor authentication service. Additionally or alternatively, Step S260 may include directing an external service to perform a particular task, or performing a particular task. For example, Step S260 may include directing a two-factor authentication service to email administrators with a list of identified services, or Step S260 may include querying the two-factor authentication service to receive a list of administrator email addresses and then emailing administrators with a list of the identified services. However, Step S260 can generate any suitable service discovery notification in any suitable fashion.

2.7 Implementing Security Measures.

Step S270 recites: implementing security measures with identified services, which functions to incorporate security measures (e.g., 2FA) with selected identified services. Implementing security measures can be performed by a 2FA service, an SDM controller, another SDM component, and/or any suitable component.

Regarding Step S270, implementing security measures can be performed automatically in response to and/or after identifying a previously unknown service, receiving authorization by a network administrator to implement a security measure, and/or any other suitable portion of the method. Additionally or alternatively, implementing security measures can be performed at predetermined time intervals (e.g., implementing 2FA for all services identified within the past 24 hours). However, implementing security measures can be performed at any suitable time.

With respect to Step S270, selecting the security measure to implement can be based on the characteristics of the service identified (e.g., for an identified service with authority to access sensitive information within the LAN, apply a more stringent 2FA process, etc.), preferences of a administrator and/or user (e.g., always implement 2FA requiring input of a authentication code sent to a secondary device, etc.), and/or any other suitable characteristics.

In a first variation of Step S270, implementing security measures can include fully implementing a security measure with a selected identified service. For example, a 2FA service can be fully automatically integrated with a newly identified service, facilitating a lack of action needing to be taken by a network administrator. The degree to which a security measure should be implemented with a service can be based on configuration options, on an analysis of services that would benefit from the security measure (e.g., a service with access to sensitive information contained on the network, etc.), and/or any suitable criteria. However, fully implementing a security measure can be otherwise performed.

In a second variation of Step S270, implementing security measures can include partially implementing a security measure with a selected identified service. For example, configuration actions (e.g., setting 2FA configuration preferences, optimizing 2FA for the particular identified service, pre-loading the requisite files to operate 2FA with the particular identified service, etc.) for setting up 2FA with the identified services can be performed. In another example, partially implementing a security measure can include recommending which identified services would benefit from particular security measures. Such recommendations can be based on service behavioral characteristics associated with the identified service, determination of whether a given security measure can be implemented with the service (e.g., through checking a database containing information on which security measures can apply to which services), and/or any other suitable information. However, partially implementing a security measure can be otherwise performed.

In a third variation, Step S270 can include implementing security measures in response to receiving a response to an implementation option presented in a service discovery notification. For example, a service discovery notification can include an option for an administrator to initiate an automatic partial, full, or no implementation of a security measure. Implementation of the security measures can be in accordance with the type of response received. However, implementing security measures can be performed in any suitable manner with respect to service discovery notifications and corresponding responses.

Step S270 may include performing any suitable aid to security measure implementation; for example, pre-filling out some fields in a two-factor authentication configuration form. In some cases, automatic implementation may include completely implementing two-factor authentication for a particular service, preferably based on user preferences stored by the two-factor authentication service.

Steps of the method 200 are preferably substantially similar to analogous portions described in the system 100 description such that any appropriate descriptions in any section apply to other sections. However, steps of the method 200 may additionally or alternatively be performed in any suitable manner as described in the method 200 description.

The system and method of the preferred embodiment and variations thereof can be embodied and/or implemented at least in part as a machine configured to receive a computer-readable medium storing computer-readable instructions. The instructions are preferably executed by computer-executable components preferably integrated with a two-factor authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for automatically discovering services operating on a network, the system comprising:
  a service discovery database configured to store expected service behavioral characteristics and service identities of known services operating on the network, each of the service identities being associated with a set of the expected service behavioral characteristics in the service discovery database;
  a set of service discovery modules, the set of service discovery modules configured to collect service behavioral data of unknown services operating on the network, wherein the unknown services are not previously known to the network, wherein the set of service discovery modules comprise an identity provider service discovery module configure to:
    monitor authentication attempts to an identity provider service; and
    generate a log of authentication attempt data associated with the authentication attempts of services attempting to authenticate to the network;
  a service discovery module controller communicatively coupled to the service discovery database and the set of service discovery modules, the service discovery module controller configured to identify the unknown services operating on and attempting to authenticate to the network, wherein the identifying includes:
 generating a first set of service behavioral characteristics from the service behavioral data;
 analyzing the first set of service behavioral characteristics using the expected service behavioral characteristics, resulting in a first behavioral analysis;
 analyzing the log of authentication attempt data to identify characteristics of the log of authentication attempt data;
 comparing the characteristics of the log of authentication attempt data to a predetermined authentication attempt fingerprint dataset, and
 identifying a first service identity of at least one of the unknown services operating on the network that is attempting to authenticate to the network using (i) the first behavioral analysis and an association of the first service identity and a first set of the expected service behavioral characteristics and (ii) results of the comparison of the characteristics of the log of authentication attempt data to the predetermined authentication attempt fingerprint dataset; and
wherein the service discovery module controller is configured to:
 automatically implement a security measure based on identifying the after identifying the first service identity of the unknown service, wherein implementing the security measure includes modifying a network access method of the unknown service corresponding to the first service identity to require, at least, a multi-factor authentication measure for connecting to or continued operation of the unknown service on the network thereby reducing or mitigating vulnerability in the network.

2. The system of claim 1, wherein the set of service discovery modules comprises a DNS service discovery module configured to:
 receive a hostname to query;
 query a DNS server with the hostname; and
 receive a DNS response;
wherein the service discovery module controller is configured to generate the first set of service behavioral characteristics, and consequently identify the first service identity, based on the DNS response.

3. The system of claim 2, wherein the DNS service module is configured to:
 transmit an HTTP request to an address identified in the DNS response; and
 receive an HTTP response from the address;
wherein the service discovery module controller is configured to generate the first set of service behavioral characteristics, and consequently identify the first service identity, based on the HTTP response.

4. The system of claim 1, wherein the identity provider service discovery module is a plugin to the identity provider service, and wherein the identity provider service is an Active Directory service.

5. The system of claim 1, wherein the set of service discovery modules comprises a network traffic service discovery module configured to:
 monitor network traffic of the network; and
 generate a log of network traffic data associated with the network traffic, wherein the network traffic data comprises at least two of: packet source, packet destination, packet content, and transmission time;
wherein the service discovery module controller is configured to generate the first set of service behavioral characteristics, and consequently identify the first service identity, based on the log of network traffic data.

6. The system of claim 5, wherein the network traffic service discovery module is a plugin to network traffic monitoring software.

7. The system of claim 1, wherein the set of service discovery modules comprises at least two of: a DNS service discovery module, an identity provider service discovery module, and a network traffic service discovery module,
 wherein the DNS service discovery module is configured to transmit HTTP requests to identified addresses and collect HTTP response data,
 wherein the identity provider service discovery module is configured to collect authentication attempt data associated with authentication attempts to an identity provider service on the network,
 wherein the network traffic service discovery module is configured to collect network traffic data associated with the network, and
 wherein the service discovery module controller is configured to generate the first set of service behavioral characteristics, and consequently identify the first service identity, based on data collected from both a first and a second service discovery module of the set of service discovery modules.

8. The system of claim 1, wherein the set of service behavioral characteristics comprises the service behavioral data and an analysis of the service behavioral data.

9. The system of claim 8, wherein the analysis of the service behavioral data comprises at least one of: a HTTP response metric, an authentication attempt metric, and a network traffic metric,
 wherein the HTTP response metric is generated based on an HTTP response analysis of HTTP headers of an HTTP response,
 wherein the authentication attempt metric is generated based on a comparison between authentication attempts to an identity provider service on the network over a baseline timeframe and authentication attempts to the identity provider service over a later timeframe, wherein the baseline timeframe is associated with a known baseline state of the services operating on the network.

10. The system of claim 9, wherein the network traffic metric is generated based on bandwidth usage of the at least one service operating on the network.

11. The system of claim 1, wherein the service discovery module controller is further configured to:
 generate a second set of service behavioral characteristics from the service behavioral data;
 analyze the second set of service behavioral characteristics using the expected service behavioral characteristics, resulting in a second behavioral analysis; and
 identify a second service identity of at least one service operating on the network from the second behavioral analysis and an association of the second service identity and a second set of expected service behavioral characteristics.

12. The system of claim 11, wherein the first and the second sets of expected service behavioral characteristics share at least one service behavioral characteristic.

13. The system of claim 1, wherein a service discovery module of the set of service discovery modules is integrated with the service discovery module controller, and wherein the service discovery module is executed by the service discovery module controller.

14. The system of claim 1, wherein the service discovery module controller is further configured to:
control the service discovery module to transmit a service behavioral data probe configured to request service behavioral data; and
receive the requested service behavioral data, wherein the service discovery module controller is configured to generate the first set of service behavioral characteristics, and consequently identify the first service identity, based on the requested service behavioral data.

15. The system of claim 1, wherein the first behavioral analysis comprises a similarity score generated from a comparison of the first set of service behavioral characteristics and the first set of expected service behavioral characteristics.

16. The system of claim 1, wherein the service discovery module controller is configured to assign weights to service behavioral characteristics of the first set of service behavioral characteristics, wherein analyzing the first set of service behavioral characteristics comprises generating a digital fingerprint from the first set of service behavioral characteristics and the weights.

17. The system of claim 16, wherein the service discovery module is configured to identify the first service identity from a comparison of the digital fingerprint and an expected digital fingerprint associated with the first service identity.

18. The system of claim 1, wherein the first behavioral analysis comprises evaluating the first set of service behavioral characteristics using a model generated from the expected service behavioral characteristics.

19. The system of claim 18, wherein the model is configured to be updated with the first set of service behavioral characteristics, wherein the first set of service behavioral characteristics has a link to the first service identity.

20. The system of claim 19, wherein the model is updated only after verification of the link between the first set of service behavioral characteristics and the first service identity.

21. The system of claim 1 wherein the service discovery module controller is configured to:
generate a service discovery notification comprising the first service identity; and
notify an administrator of the network with the service discovery notification.

22. The system of claim 1, wherein the service discovery module controller is configured to generate a service discovery notification comprising the first service identity; wherein the service discovery notification comprises an option to verify accuracy of service identification, and wherein the service discovery module database is configured to store a response to the service discovery notification and an association between the response and the first set of service behavioral characteristics.

23. The system of claim 1, wherein the multi-factor authentication measure automatically implementing the security measure comprises configuring the at least one service to require two-factor authentication in response to identifying the first service identity.

24. A method for automatically discovering unknown services operating on a network, the method comprising:
storing expected service behavioral characteristics and service identities of known services operating on the network, each service identity associated with a set of the expected service behavioral characteristics;
collecting service behavioral data of the unknown services operating on the network;
monitoring authentication attempts to an identity provider service and generating a log of authentication attempt data associated with the authentication attempts of services attempting to authenticate to the network;
generating service behavioral characteristics from the service behavioral data;
analyzing the service behavioral characteristics using the expected service behavioral characteristics, resulting in a first behavioral analysis;
analyzing the log of authentication attempt data to identify characteristics of the log of authentication attempt data;
comparing the characteristics of the log of authentication attempt data to a predetermined authentication attempt fingerprint dataset, and
identifying a first service identity of at least one of the unknown services operating on the network that is attempting to authenticate to the network based on (i) the first behavioral analysis and an association of the first service identity and a first set of the expected service behavioral characteristics and (ii) results of the comparison of the characteristics of the log of authentication attempt data to the predetermined authentication attempt fingerprint dataset;
wherein, based on identifying the first service of the at least one of the unknown services operating on the network:
automatically implementing a security measure based on identifying the first service identity of the unknown service, wherein implementing the security measure includes modifying a network access method of the at least one unknown service corresponding to the first service identity to require an authentication measure comprising a multi-factor authentication for continued operation of the unknown service on the network thereby reducing or mitigating vulnerability in the network.

* * * * *

UNITED STATES PATENT AND TRADEMARK OFFICE
CERTIFICATE OF CORRECTION

| | |
|---|---|
| PATENT NO. | : 9,930,025 B2 |
| APPLICATION NO. | : 15/075687 |
| DATED | : March 27, 2018 |
| INVENTOR(S) | : Jon Oberheide and Dug Song |

It is certified that error appears in the above-identified patent and that said Letters Patent is hereby corrected as shown below:

In the Claims

In Column 23, Line 28, "automatically implement a security measure based on identifying the after identifying the first service identity" should read "automatically implement a security measure based on identifying the first service"

In Column 26, Line 4, "authentication measure automatically implementing the security measure comprises configuring the at least one service" should read "authentication measure comprises configuring the at least one service"

Signed and Sealed this
Tenth Day of July, 2018

Andrei Iancu
*Director of the United States Patent and Trademark Office*